UNITED STATES PATENT OFFICE.

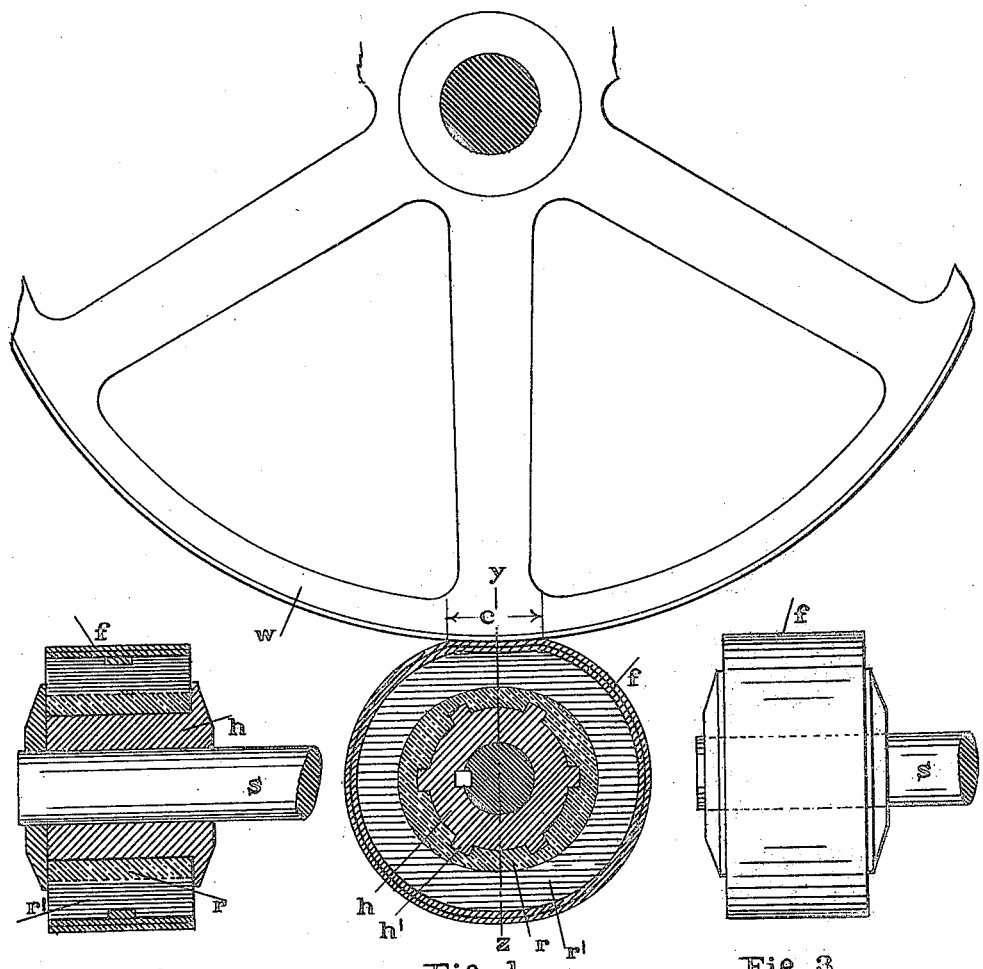

WILLIAM PARIS BARCLAY, OF CHICAGO, ILLINOIS.

TOOTHED-HUB FRICTION PINION.

1,403,377. Specification of Letters Patent. Patented Jan. 10, 1922.

Application filed April 28, 1921. Serial No. 465,119.

*To all whom it may concern:*

Be it known that I, WILLIAM PARIS BARCLAY, a citizen of the United States, residing at Chicago, in the county of Cook and State of Illinois, have invented a new and useful Toothed-Hub Friction Pinion, of which the following is a specification.

This invention relates to a friction pinion for machinery driving purposes by frictional contact between the peripherical surface of a pulley or wheel and the peripherical surface of a friction pinion.

In the extensive use of electric machinery revolving at a high speed and where metal spur gear wheels are used, there is produced more or less noise, and which it would be a desirable object to lessen or entirely obviate, and to accomplish the said object I have devised a friction pinion for peripherical contact with a pulley or wheel to fulfill the driving and rotating conditinos of ordinary spur and pinion metal gears running at a high speed minus the noise thereof.

Referring to the drawings, in which similar letters refer to similar parts:

Fig. 1, shows an exterior side view of the toothed friction pinion in peripherical contact with a pulley or wheel $w$.

Fig. 2, shows a sectional view of the friction pinion taken on line $y$, $z$, of Fig. 1, mounted on its driving shaft $s$.

Fig. 3, shows an exterior peripherical view of the said pinion; the said view also showing the friction pinion mounted on its shaft $s$.

Fig. 4, represents segments of circles of an ordinary friction pinion and pulley, to illustrate the amount of grip contact between a friction pinion and a pulley when the peripherical contact surfaces each form an entire circle with each other.

The metal hub $h$ of the friction pinion is formed with a number of driving teeth $h'$, and closely surrounding the periphery of the hub $h$ is a flexible material $r$ preferably rubber, from the fact that the said material can be attached to the hub $h$ under different conditions of hardness and flexibility by a vulcanite or heat process, the inner part $r$ close to the hub $h$ being harder and less elastic than the larger rubber part $r'$ surrounding the same, and which is of a more elastic and pliable nature, so as to readily yield to the pressure of a pulley or wheel $w$ in circumferential contact with the friction pulley, whereby an increase in grip driving contact is attained, as is shown by comparing the amount of grip contact between the said pinion and the pulley or wheel $w$, as indicated between points $c$ in Fig. 1. The grip contact between a non-compressible pinion and a wheel is shown represented in Fig. 4, by two circular segments, as indicated between points $d$. Closely surrounding the outer circumferential part of the rubber portion $r'$, of the friction pinion is one or more courses of leather $l$, or a material of similar elasticity and hardness, whereby an efficient amount of wear during the operation of the friction pinion will be attained.

The toothed hub $h$ of the friction pinion is rigidly attached to its shaft $s$, and it is evident that each tooth $h'$ thereof, when the said pinion is revolving will act all together against the rubber material as one unit, to transmit energy from the friction pinion, to the wheel or pulley $w$, in contact therewith

What I claim as new and desire to secure by Letters Patent is—

1. In a friction pinion the combination of a toothed metal hub mounted on a shaft, a hard rubber or vulcanite material circumferentially surrounding the aforesaid metal hub, an elastic rubber material vulcanited circumferentially to the aforesaid hard rubber material, and one or more courses of a less elastic material such as leather circumferentially surrounding the elastic rubber material, substantially as shown and described.

2. In a friction pinion the combination of a toothed hub attached to a shaft, a rubber vulcanite material mounted upon the hub, circumferentially surrounded by a flexible rubber material encased in a leather band to secure maximum wearing service of the friction pinion during its operation.

3. In a friction pinion, the combination of a toothed hub with a flexible material of varying hardness mounted upon the said hub encased in one or more courses of leather circumferentially surrounding said flexible material for frictional contact with a pulley or wheel, substantally as shown and described

WILLIAM PARIS BARCLAY.